(12) United States Patent
Skuse et al.

(10) Patent No.: US 7,744,688 B2
(45) Date of Patent: Jun. 29, 2010

(54) PAPER COATING PIGMENTS

(75) Inventors: David Skuse, Truro (GB); Mark Mortimer, Beverley (GB); Deb Thrale, Par (GB); Rajan R. Iyer, Watkinsville, GA (US); Daniel J. Panfil, Milledgeville, GA (US); Christopher Nutbeem, St. Austell (GB)

(73) Assignee: Imerys Pigments, Inc., Roswell, GA (US)

( * ) Notice: Subject to any disclaimer, the term of this patent is extended or adjusted under 35 U.S.C. 154(b) by 0 days.

(21) Appl. No.: 10/538,012

(22) PCT Filed: Dec. 29, 2003

(86) PCT No.: PCT/GB03/05686

§ 371 (c)(1),
(2), (4) Date: Sep. 7, 2006

(87) PCT Pub. No.: WO2004/059079

PCT Pub. Date: Jul. 15, 2004

(65) Prior Publication Data

US 2006/0292305 A1 Dec. 28, 2006

Related U.S. Application Data

(60) Provisional application No. 60/436,465, filed on Dec. 27, 2002.

(51) Int. Cl.
- *C09D 1/00* (2006.01)
- *C04B 14/04* (2006.01)
- *C09C 1/02* (2006.01)
- *D21H 11/00* (2006.01)
- *C01F 5/24* (2006.01)

(52) U.S. Cl. .................. 106/464; 106/286.5; 106/463; 106/486; 162/181.8; 423/430

(58) Field of Classification Search ............... 162/181.8, 162/135; 106/486, 469, 468, 463–464, 461; 423/430; 516/78, 100
See application file for complete search history.

(56) References Cited

U.S. PATENT DOCUMENTS 1,350,694 A 8/1920 Alton et al.

(Continued)

FOREIGN PATENT DOCUMENTS

EP 0 521 737 A1 1/1993

(Continued)

OTHER PUBLICATIONS

Strutz, M.D. et al. "The Advantages of Blending Ultrafine Ground Limestone and Scalenohedral Precipitated Calcium Carbonate as Filler for Alkaline Papers," *Proceedings of the TAPPI Papermakers Conference.* Atlanta, Georgia: Technical Association of the Pulp and Paper Industry, 1988, pp. 55-63.

(Continued)

*Primary Examiner*—Jerry Lorengo
*Assistant Examiner*—Shuangyi Abu Ali
(74) *Attorney, Agent, or Firm*—Finnegan, Henderson, Farabow, Garrett & Dunner, L.L.P.

(57) ABSTRACT

The present disclosure relates to a coating composition for use in producing a coating on paper and other substrates comprising an aqueous suspension of a particulate pigment together with a binder, wherein the particulate pigment comprises a mixture of: a first pigment component comprising particulate ground calcium carbonate (GCC) having a particle size distribution (psd) steepness factor ranging from about 30 to about 45; and a second pigment component comprising particulate precipitated calcium carbonate (PCC) having a psd steepness factor ranging from about 55 to about 75. The particulate pigment may optionally further include a particulate kaolin clay.

53 Claims, 3 Drawing Sheets

Tappi Opacity

U.S. PATENT DOCUMENTS

| | | | |
|---|---|---|---|
| 4,026,762 | A | 5/1977 | Bauman |
| 4,606,503 | A | 8/1986 | Bleeck |
| 4,835,195 | A | 5/1989 | Rayfield et al. |
| 4,898,620 | A | 2/1990 | Rayfield et al. |
| 5,128,606 | A | 7/1992 | Gate et al. |
| 5,478,388 | A | 12/1995 | Gane et al. |
| 5,833,747 | A | 11/1998 | Bleakley et al. |
| 5,879,442 | A * | 3/1999 | Nishiguchi et al. .......... 106/464 |
| 5,882,396 | A | 3/1999 | Hiorns |
| 6,140,376 | A * | 10/2000 | Golley et al. .................. 516/78 |
| 6,143,064 | A | 11/2000 | Virtanen |
| 6,284,034 | B1 | 9/2001 | Hiorns et al. |
| 6,592,837 | B2 * | 7/2003 | Denholm et al. ............ 423/430 |
| RE38,301 | E | 11/2003 | Bleakley et al. |
| 6,666,953 | B1 | 12/2003 | Gane et al. |
| 6,682,775 | B2 | 1/2004 | Calhoun et al. |
| 6,808,559 | B2 * | 10/2004 | Golley et al. ................ 106/486 |
| 2002/0022084 | A1 | 2/2002 | Calhoun et al. |
| 2005/0126730 | A1 * | 6/2005 | Lorusso ................... 162/181.8 |
| 2006/0102304 | A1 * | 5/2006 | Nutbeem et al. ............ 162/135 |

FOREIGN PATENT DOCUMENTS

| | | |
|---|---|---|
| EP | 0 528 078 | 2/1993 |
| EP | 0 595 723 A1 | 7/1996 |
| EP | 0 850 880 | 7/1998 |
| EP | 0850685 A2 | 7/1998 |
| EP | 1160201 A2 | 12/2001 |
| GB | 2240398 A | 7/1991 |
| JP | 55-022072 | 2/1980 |
| JP | 03-040897 | 2/1991 |
| JP | 06-073695 | 3/1994 |
| JP | 06-073698 | 3/1994 |
| JP | 07-238495 | 9/1995 |
| JP | 08-027694 | 1/1996 |
| JP | 10-280295 | 10/1998 |
| JP | 2000-007330 | 1/2000 |
| JP | 2002-173323 | 6/2002 |
| WO | WO 00/66510 * | 9/2000 |
| WO | WO 00/66510 | 11/2000 |
| WO | WO 01/53893 A1 | 7/2001 |
| WO | WO 03/054300 A1 | 7/2003 |
| WO | WO 2004/016566 A1 | 2/2004 |
| WO | WO 2004/059079 A2 | 7/2004 |
| WO | WO 2005/005979 A1 | 1/2005 |

OTHER PUBLICATIONS

English-language abstract for EP 0 595 723 A1, published Jul. 31, 1996.

English-language abstract for JP 03-040897, published Feb. 21, 1991.

English-language abstract for JP 06-073695, published Mar. 15, 1994.

English-language abstract for JP 06-073698, published Mar. 15, 1994.

English-language abstract for JP 07-238495, published Sep. 12, 1995.

English-language abstract for JP 08-027694, published Jan. 30, 1996.

English-language abstract for JP 10-280295, published Oct. 20, 1998.

English-language abstract for JP 2000-007330, published Jan. 11, 2000.

English-language abstract for JP 2002-173323, published Jun. 21, 2002.

International Search Report for PCT/GB03/05686 dated Nov. 1, 2004.

English-language abstract of JP 55-022072.

Werner Rüdiger, "Steep Particle Size Distribution Curves as a Determining Factor in the Use of Fine Extenders in Various Coating Systems," 1998 FSCT Annual Meeting Technical Program in New Orleans, LA (1998).

"Coated Paper Producers Look Forward to Brighter Times," Pulp & Paper International 18-31 (May 1994).

* cited by examiner

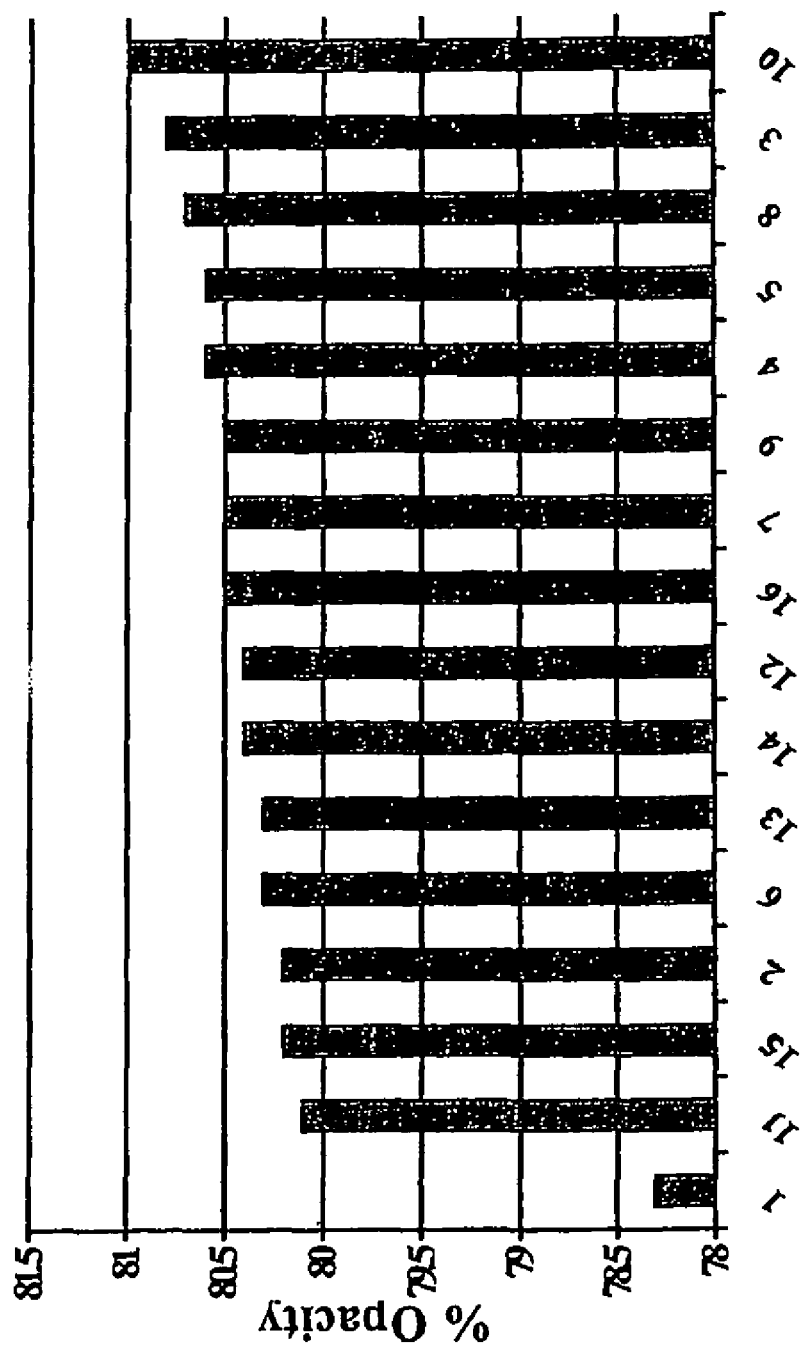

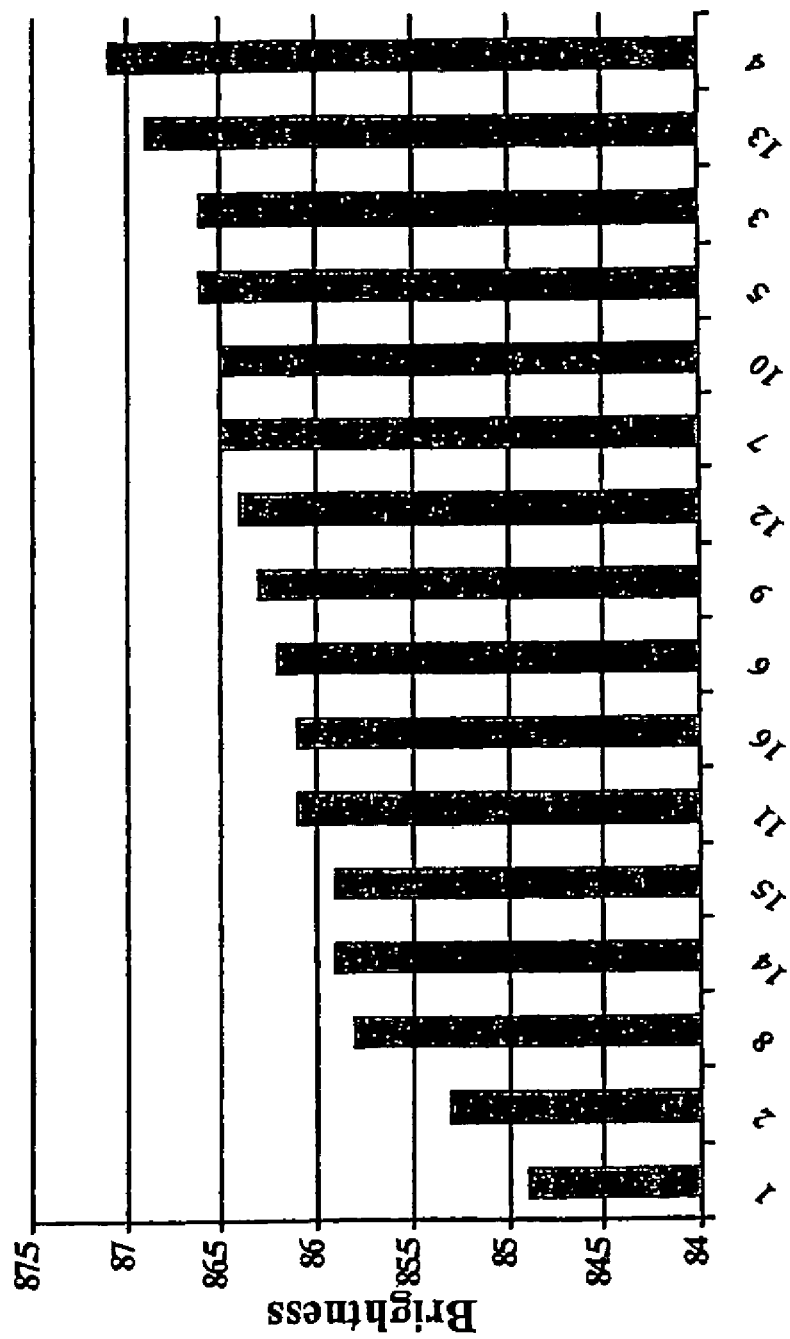
Figure 2: Tappi Sheet Brightness

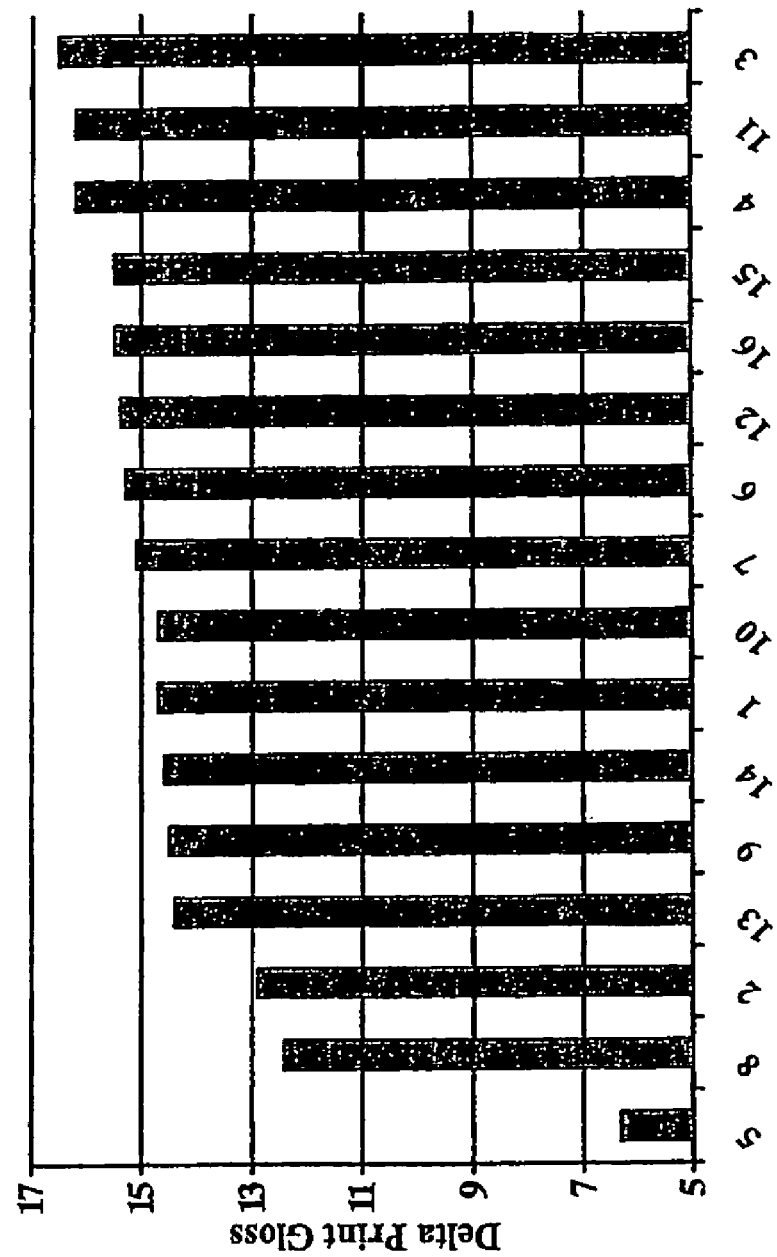
Figure 3: Delta Gloss

PAPER COATING PIGMENTS

This application is the National Stage Entry of International Application No. PCT/GB2003/005686 (International Publication No. WO 2004/059079) filed Dec. 29, 2003, the contents of which are incorporated herein by reference. This application also claims benefit of U.S. Provisional Application No. 60/436,465, filed Dec. 27, 2002, the contents of which are also incorporated herein by reference.

FIELD OF THE INVENTION

The present invention relates to paper coating pigments. For example, the present invention relates to a paper coating composition comprising particulate calcium carbonate, to methods for preparing the composition, to the use of the composition in paper coating, and to coated paper prepared using the composition. The term "paper" should be understood to mean all forms of paper, including board, card, paperboard, and the like.

BACKGROUND OF THE INVENTION

Coated paper is used for a large range of products including packaging, board art paper, brochures, magazines, catalogues and leaflets. Such coated paper is required to give a range of properties, including brightness, opacity and sheet gloss, as well as printing performance.

Paper coating compositions are generally prepared by forming a fluid aqueous suspension of particulate pigment material together with a binder and other optional ingredients. The coating may conveniently be applied by means of a coating machine including a short dwell time coating head, which is a device in which a captive pond of coating composition under a slightly elevated pressure is held in contact with a moving paper web for a time in the range of from 0.0004 second to 0.01 second, before excess coating composition is removed by means of a metering blade. However, other types of coating apparatus may also be used for preparing coated paper. The coated paper is required to meet certain standards of surface gloss and smoothness. For example, the paper is generally required to have a gloss value of at least about 32, and up to about 70, in some cases up to about 90 TAPPI units, and a Parker Print Surf value in the range of from about 0.5 μm to about 1.6 μm.

It is known to use particulate calcium carbonate, either alone or in conjunction with other pigment material such as, for example, processed particulate kaolin clay, as a particulate pigment in paper coating compositions.

Particulate calcium carbonate can be obtained from natural sources or can be manufactured synthetically. Manufactured calcium carbonate is generally obtained by precipitation from aqueous solution. Precipitated calcium carbonate (PCC) is obtained in three different principal crystal forms: the vaterite form, which is thermodynamically unstable, the calcite form which is the most stable and is also the most abundant natural crystalline form, and the aragonite form which is metastable under normal ambient conditions of temperature and pressure, but converts to calcite at elevated temperatures.

The aragonite form typically crystallises as long, thin needles (acicular shape) having a typical length:diameter ratio of about 10:1, but the calcite form exists in several different shapes, of which the most commonly found are: the rhombohedral shape in which the crystals may be either aggregated or unaggregated; and the scalenodedral shape, in which the crystals are like double, two-pointed pyramids having a typical length:diameter ratio of about 4:1, and which are generally aggregated. All these forms of calcium carbonate can be prepared by carbonation of an aqueous lime-containing medium by suitable variation of the process conditions.

Calcium carbonate can be ground to obtain particulate ground calcium carbonate (GCC), by methods which are well known in the art.

Blends of PCC and GCC, and of different GCCs, for use in paper coating are known in the art.

For instance, U.S. Pat. No. 5,879,442, the disclosure of which is incorporated herein by reference, describes an aqueous slurry of calcium carbonate for use as a paper coating pigment, the slurry containing from 70 to 85% by weight of a combination of PCC particles and GCC particles in a weight proportion in the range 20:80 to 80:20, advantageously from 51:49 to 70:30. The calcium carbonate particles according to this patent have a median diameter in the range 0.2 to 2.0 μm, preferably from 0.3 to 1.5 μm. This patent, however, does not disclose the particle size distribution for the calcium carbonate particles.

Similarly, PCT Patent Application No. WO-A-01/53893, the disclosure of which is incorporated herein by reference, describes a printing paper having an image-receptive coating comprising a binder and a non-platy pigment. Examples are given (e.g. Examples A to D) of a non-platy pigment which comprises (out of 100 parts) 15 parts GCC, 75 to 79 parts PCC and 6 to 10 parts of a hollow sphere plastic pigment. This patent application discloses that, for glossy coated printing sheets, preferably about 90 to 95% of the calcium carbonate particles have an equivalent spherical diameter (esd) less than 2 μm and that, for matte coated printing sheets, preferably about 65% of the particles have an esd of less than 2 μm. The patent application also describes the calcium carbonate pigment exhibiting a relatively narrow particle size distribution, but it does not disclose what this is relative to. Further, details of the particle size distribution are not given.

The present invention comprises the discovery that improved properties can be obtained when paper is coated with a paper coating composition which includes a pigment comprising a blend of a selected particulate PCC and a selected particulate GCC or a blend of selected particulate GCCs. By using a blend of selected particulate PCC and GCC, a synergistic improvement to the opacity, brightness and print gloss of the paper has been discovered, when compared to paper in which the pigment in the coating is either one of the individual components of the blend.

SUMMARY OF THE INVENTION

The present invention achieves these and other advantages, in a first aspect of the present invention, by providing a coating composition for use in producing a coating on paper and other substrates. The coating composition according to this aspect comprises an aqueous suspension of a particulate pigment together with a binder, wherein the particulate pigment comprises a mixture of: a first pigment component comprising or consisting of particulate GCC having a psd steepness factor between about 30 and about 45; and a second pigment component comprising or consisting of particulate PCC having a psd steepness factor between about 55 and about 75. Alternatively, the pigment comprises particulate GCC having a psd steepness factor between about 40 and about 55.

The steepness factor is defined as the ratio of the $d_{30}$ equivalent spherical diameter (at which 30% by weight of the particles are finer) to the $d_{70}$ equivalent spherical diameter (at which 70% by weight of the particles are finer), multiplied by 100.

As used herein, the parameter esd is measured in a well known manner by sedimentation of the particulate material in a fully dispersed condition in an aqueous medium using a Sedigraph 5100 machine as supplied by Micromeritics Instruments Corporation, Norcross, Ga., USA, referred to herein as a "Micromeritics Sedigraph 5100 unit". Such a machine provides measurements and a plot of the cumulative percentage by weight of particles having an esd less than given esd values.

The PCC may comprise known particulate shapes, including aragonitic particle shapes, rhombohedral particle shapes, or any mixture thereof.

The psd steepness of the first (GCC) component used in the present invention is generally around the middle or towards the lower end of the range of steepnesses of commercially available GCCs. The psd steepness of the second (PCC or GCC) component used in the present invention is generally towards the upper end of the range of steepnesses of commercially available PCCs and GCCs. The present invention thus provides a blend of low-to-medium and high steepness factor particulate calcium carbonates.

The first and second components are suitably present in the particulate pigment in a weight ratio of ranging from about 5:95 to about 95:5 PCC:GCC, e.g., between about 10:90 and about 90:10, more preferably between about 20:80 and about 80:20 first:second, e.g., between about 30:70 and about 70:30 first:second.

Surprisingly, the optical properties of coating compositions using the carbonates according to the present invention are generally comparable with those of coating compositions using solely steep GCCs (steepness factor above about 45) or steep PCCs (steepness factor above about 55). The coating composition may optionally include further components, as discussed in more detail below. Optional additional particulate pigment components may include a suitable particulate kaolin clay.

The invention also relates to methods for preparing the coating composition of the present invention; to pigment blends for use in preparing the coating composition; to methods for preparing paper coated with the coating composition; and to paper coated with the coating composition.

DETAILED DESCRIPTION OF THE INVENTION

The Particulate Pigment—First (GCC) Component

GCC is produced from natural or precipitated calcium carbonate by grinding methods which are well known in the art.

The psd of the GCC used as the first component in the blend of the present invention is suitably such that at least about 80% by weight of the calcium carbonate particles have an equivalent spherical diameter less than 2 μm, at least about 50% by weight of the particles have an equivalent spherical diameter less than 1 μm, at least about 25% by weight of the particles have an equivalent spherical diameter less than 0.5 μm, and less than about 25% by weight of the particles have an equivalent spherical diameter less than 0.25 μm. For example, at least about 90% by weight of the particles may suitably have an equivalent spherical diameter less than 2 μm, at least about 70% by weight of the particles may have an equivalent spherical diameter less than 1 μm, at least about 30% by weight of the particles may have an equivalent spherical diameter less than 0.5 μm, and less than about 25% (e.g., 15-22%) by weight of the particles may have an equivalent spherical diameter less than 0.25 μm. The mean (average) equivalent particle diameter ($d_{50}$ value) of the particulate calcium carbonate after grinding may suitably be in the range about 0.4 to about 1.2 μm, for example in the range about 0.4 to about 1.0 μm.

The psd steepness factor of the GCC used as the first component in the blend of the present invention is preferably in the range of about 35 to about 45, for example in the range of about 37 to about 45.

In certain embodiments, the GCC used as the first component in the blend of the present invention has a brightness (GE) above about 93.

Examples of commercially available or readily preparable materials include:

GCC "A". An exemplary psd is as follows: 91% by weight less than 2 μm; 65% by weight less than 1 μm; 38% by weight less than 0.5 μm; and 20% by weight less than 0.25 μm. The GCC exhibits a GE Brightness of 96.0, and a $d_{50}$ of 0.70 μm, and a steepness factor of 35. Such a material is Carbital 90™, available from Imerys.

GCC "B". An exemplary psd is as follows: 96% by weight less than 2 μm; 75% by weight less than 1 μm; 39% by weight less than 0.5 μm; and 17% by weight less than 0.25 μm. The GCC exhibits a GE Brightness of 94.4, a $d_{50}$ of 0.62 μm, and a steepness factor of 44.

GCC "C". An exemplary psd is as follows: 94% by weight less than 2 μm; 69% by weight less than 1 μm; 35% by weight less than 0.5 μm; and 16% by weight less than 0.25 μm. The GCC exhibits a GE Brightness of 96.7, a $d_{50}$ of 0.69 μm, and a steepness factor of 43.

GCC "H". An exemplary psd is as follows: 98% by weight less than 2 μm; 87% by weight less than 1 μm; 54% by weight less than 0.5 μm; and 23% by weight less than 0.25 μm. The GCC exhibits an ISO Brightness of 95.4, a $d_{50}$ of 0.44 μm, and a steepness factor of 43.

GCC "I". An exemplary psd is as follows: 97% by weight less than 2 μm; 76% by weight less than 1 μm; 47% by weight less than 0.5 μm; and 28% by weight less than 0.25 μm. The GCC exhibits an ISO Brightness of 93.5, a $d_{50}$ of 0.50 μm, and a steepness factor of 36. Such a material is Carbital 95 available from Imerys.

The Particulate Pigment—Second (PCC or GCC) Component

PCC Component

The PCC used in the second component of the blend of the present invention may be one of the readily commercially available "steep" PCCs, or can be prepared by methods well known in the art.

The methods for preparing PCC generally comprise precipitation using (i) lime and carbon dioxide, (ii) lime and soda or (iii) the Solvay process. A preferred method for preparing aragonitic or rhombohedral PCC uses the first method, and includes the step of carbonating an aqueous lime-containing medium to produce an aqueous suspension of a PCC. The precipitation process conditions required to achieve a preferred crystal form are well known to those skilled in the art.

For example, predominantly the aragonitic crystal form is precipitated when the aqueous lime-containing medium is prepared by mixing quicklime with water at a temperature not exceeding 60° C. This mixing step is generally performed to give an aqueous suspension containing from 0.5 to 3.0 moles of calcium hydroxide per liter of suspension under conditions such that the temperature of the suspension increases by not more than 80° C. The resultant suspension of slaked lime is then cooled to a temperature in the range from 30 to 50° C. A carbonation step is then carried out on the suspension. For example, the subsequent carbonation may involve passing a carbon dioxide containing gas through the cooled suspension at a rate such that not more than 0.02 moles of carbon dioxide are supplied per minute per mole of calcium hydroxide to precipitate calcium carbonate in the suspension. During this carbonation step, the temperature of the suspension is maintained within the range from 30 to 50° C. until the pH has fallen to a value within the range from 7.0 to 7.5.

The precipitate product in the form of an aqueous suspension generally has a viscosity of not more than 500 mPa·s (as measured by a Brookfield Viscometer using a spindle speed of 100 rpm) and, for certain embodiments is advantageously a pumpable and flowable slurry.

The aqueous suspension containing the precipitate product initially formed may be treated so as to separate partially or fully the aqueous host medium from the precipitate product solids, e.g., using conventional separation processes. The processes include filtration, sedimentation, centrifugation, and evaporation. For example, filtration using a filter press may be used. The separated aqueous medium (e.g., water) may—optionally with further purification or clarification by one or more chemical, biochemical or mechanical processes which may be known per se—be recycled for reuse. For example, recycled water may be used for diluting the paper-making stock or for use as showers for washing machinery in a paper mill. The separated solids may be assessed for quality control by measurements taken on samples and subsequently delivered to a storage tank and thereafter supplied as necessary for use in a user application, such as in the present invention. The solids containing suspension may be re-diluted for use at the user plant.

It is not necessary for an aqueous suspension containing a PCC product to be dewatered prior to supply for use in a user application, e.g. for use in a paper mill. The aqueous suspension or slurry may be delivered to a storage tank or directly to the user plant without substantial dewatering.

The PCC typically has a $d_{50}$ of less than about 1 µm, e.g., less than about 0.8 µm, and suitably at least about 0.2 µm, e.g. between about 0.25 µm and about 0.7 µm. Preferably the PCC has a $d_{50}$ not greater than 0.5 µm and preferably the PCC has a $d_{50}$ in the range of 0.3 µm to 0.5 µm. More preferably the PCC has a $d_{50}$ less than 0.5 µm, e.g., less than 0.45 µm or less than 0.40 µm or less than 0.35 µm. Most preferably the PCC has a $d_{50}$ of about 0.4 µm.

The PCC component of the pigment products according to the present invention preferably has a particle size distribution such that at least about 90% by weight (e.g. at least about 95% by weight) of the particles have an esd less than 2 µm.

The PCC employed in the present invention may, if predominantly aragonite, have in the fully dispersed state a particle size distribution such that the percentage P by weight of particles having a size less than xµm, where x is respectively 2 µm, 1 µm, 0.5 µm and 0.25 µm is as follows:

| X (µm) | P (%) |
|---|---|
| 2 | At least 90 |
| 1 | At least 75 |
| 0.5 | At least 60 |
| 0.25 | Between 15 and 40 |

The PCC employed in the present invention may have the particle size distribution as follows:

| X (µm) | P (%) |
|---|---|
| 2 | At least 95 |
| 1 | At least 82 |
| 0.5 | At least 66 |
| 0.25 | Between 15 and 33 |

Alternatively, the PCC employed in the compositions of the present invention may, if predominantly rhombohedral, have in the fully dispersed state a particle size distribution such that the percentage P by weight of particles having a size less than xµm, where x is respectively 2 µm, 1 µm, 0.5 µm and 0.25 µm, is as follows:

| X (µm) | P (%) |
|---|---|
| 2 | At least 93 |
| 1 | At least 86 |
| 0.5 | At least 22 |
| 0.25 | Between 0 and 25 |

The PCC employed in the compositions of the present invention may have the particle size distribution as follows (x and P as defined above):

| X (µm) | P (%) |
|---|---|
| 2 | At least 97 |
| 1 | At least 90 |
| 0.5 | At least 25 |
| 0.25 | Between 2 and 19 |

The median equivalent particle diameter of such a rhombohedral PCC may be from about 0.4 to about 0.7 µm.

The PCC employed in the compositions of the invention may have a GE powder brightness of at least 90, e.g., at least 92.

The crystal PCC form achieved in practice is unlikely to be 100% of any selected form. It is quite usual for one crystal form, even when predominant, to be mixed with other forms. Typically, it might be expected that over 50% by weight of the particles are of the selected form, for example over about 60% by weight, with certain embodiments being at least about 80% by weight. Such mixed forms will generally give suitable product properties. The expression "predominantly", when used in reference to the particle shapes or crystal forms, shall be understood in this way, so that, for example a PCC which is described as "predominantly aragonitic" may also include up to 50% by weight of one or more other particle shapes or crystal forms, e.g., rhombohedral.

Where a mixture of aragonitic and rhombohedral crystal shapes is required according to the present invention, this may be prepared by conventional mixing techniques.

Examples of commercially available materials include:

PCC "D". This comprises predominantly rhombohedral crystal shapes. The typical particle size distribution is as follows: 99% by weight less than 2 µm; 94% by weight less than 1 µm; 38% by weight less than 0.5 µm; and 3% by weight less than 0.25 µm. This PCC material exhibits a GE Brightness of 98.7, a $d_{50}$ of 0.55 µm, and a steepness factor of 70. Such a material is OptiCalPrint™, available from Imerys.

PCC "E". This comprises predominantly aragonitic crystal shapes. The typical particle size distribution is as follows: 99% by weight less than 2 µm; 98% by weight less than 1 µm; 76% by weight less than 0.5 µm; and 27% by weight less than 0.25 µm. This PCC material exhibits a GE Brightness of 96.1, a $d_{50}$ of 0.36 µm, and a steepness factor of 57. Such a material is OptiCalGloss™, available from Imerys.

PCC "J". This comprises predominantly rhombohedral crystal shapes. The typical particle size distribution is as follows: 99% by weight less than 2 µm; 97% by weight less than 1 µm; 68% by weight less than 0.5 µm; and 17% by weight less than 0.25 µm. This PCC material exhibits an ISO Brightness of 97.1, a $d_{50}$ of 0.4 µm, and a steepness factor of 60. Such a material is Opti-Print 400™, available from Imerys.

The mean equivalent particle size $d_{50}$ is the value, determined using the Sedigraph apparatus mentioned above, of the particle esd at which there are 50% by weight of the particles which have an equivalent spherical diameter less than that $d_{50}$ value.

GCC Component

The GCC used in the second component of the blend of the present invention may be one of the readily commercially available "steep" GCCs, or can be prepared by methods well known in the art.

Examples of commercially available or readily preparable materials include:

GCC "F". The typical psd is as follows: 96% by weight less than 2 µm; 74% by weight less than 1 µm; 34% by weight less than 0.5 µm; and 12% by weight less than 0.25 µm. This GCC material exhibits a GE Brightness of 97.0, a $d_{50}$ of 0.67 µm, and a steepness factor of 50. Such a material is Carbopaque™, available from Imerys.

GCC "G". The typical psd is as follows: 95% by weight less than 2 µm; 74% by weight less than 1 µm; 35% by weight less than 0.5 µm; and 12% by weight less than 0.25 µm. The GE Brightness is 96.3 and the $d_{50}$ is 0.65 µm; steepness factor 49.

The Particulate Pigment—Optional Kaolin Component

Any processed kaolin clay component of the particulate pigment used in the present invention is generally a particulate clay suitable for use in paper coating compositions which is readily commercially available. Such clays are readily prepared by methods well known in the art.

The kaolin clay component employed in the compositions of the present invention may suitably be a kaolin having a high brightness, e.g., a GE powder brightness of at least 85, e.g., at least 90.

A particulate kaolin clay of high shape factor is considered to be more "platey" than a kaolin product of low shape factor. "Shape factor" as used herein is a measure of an average value (on a weight average basis) of the ratio of mean particle diameter to particle thickness for a population of particles of varying size and shape as measured using the electrical conductivity method and apparatus described in GB-A-2240398/U.S. Pat. No. 5,128,606/EP-A-0528078 and using the equations derived in these patent specifications. "Mean particle diameter" is defined as the diameter of a circle which has the same area as the largest face of the particle. In the measurement method described in EP-A-0528078, the electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube, and using the difference between the two conductivity measurements the shape factor of the particulate material under test is determined.

As stated above, the shape factor of any particulate kaolin clays used in the present invention may be greater than, equal to, or less than about 25, or may be greater than or equal to about 45, depending on the nature of the first component of the coating composition. Where the shape factor is above about 25, it may advantageously be above about 30, more advantageously above about 35. Where the shape factor is below about 25, it may be preferred in certain embodiments to be between about 5 and about 20.

The value of $d_{50}$ for any particulate kaolin clays used in the present invention may be less than, equal to or greater than about 0.5 µm. Where the $d_{50}$ for the particulate kaolin clay is greater than or equal to about 0.5 µm, it may suitably be in the range from about 0.5 µm to about 1.5 µm. Where the $d_{50}$ for the particulate kaolin is less than or equal to about 0.5 µm, it may suitably be in the range from about 0.1 µm to about 0.5 µm.

Where the kaolin clay to be used has a shape factor less than about 25, the clay will advantageously have a $d_{50}$ less than about 0.5 µm, for example in the range about 0.1 µm to about 0.3 µm.

The steepness of any particulate kaolin clay used in the present invention may be less than, equal to or greater than about 20. Where the steepness of the particulate kaolin clay is greater than about 20, it may suitably be between about 25 and about 45, e.g., between about 35 and about 45, and typically less than about 40.

When present, the kaolin clay may be present with the calcium carbonate pigment in a weight ratio of at least about 10:90 calcium carbonate:kaolin clay generally above about 50:50, and less than about 90:10, e.g., at a weight ratio of about 70:30.

Any processed kaolin clay used in the present invention may be prepared from the raw natural kaolin clay mineral by one or more other processes which are well known to those skilled in the art, for example by known refining or beneficiation steps.

The Binder

The binder of the composition according to the present invention may be selected from binders which are well known in the art. The binder may form from 4% to 30%, e.g., 8% to 20%, especially 8% to 15%, by weight of the solids content of the composition. The amount employed will depend upon the composition and the type of binder, which may itself incorporate one or more ingredients.

Examples of suitable binders include:

Starch. Levels typically range from about 4% by weight to about 20% by weight. The starch may suitably be derived from a natural starch, e.g., natural starch obtained from a known plant source, for example, wheat, maize, potato or tapioca. Where starch is employed as a binder ingredient, the starch may be employed in an unmodified and/or modified form. An example of a suitable unmodified starch is Pearl starch. Where starch is employed as a binder ingredient in a modified form, the starch may suitably be modified by one or more chemical treatments known in the art. The starch may, for example, be oxidized to convert some of its —$CH_2OH$ groups to —COOH groups. In some cases the starch may have a small proportion of acetyl, —$COCH_3$, groups. Alternatively, the starch may be chemically treated to render it cationic or amphoteric, i.e., with both cationic and anionic charges. The starch may also be converted to a starch ether, or hydroxyalkylated starch by replacing some —OH groups with, for example, —OCH$_2$CH$_2$OH groups, —OCH$_2$CH$_3$ groups or OCH$_2$CH$_2$CH$_2$OH groups. A further class of chemically treated starches which may be used is that known as the starch phosphates. Alternatively, the raw starch may be hydrolyzed by means of a dilute acid or an enzyme to produce a gum of the dextrin type. The amount of the starch binder used in the composition according to the present invention can be from about 4% to about 25% by weight, based on the dry weight of pigment. The starch binder may be used in conjunction with one or more other binders, for example synthetic binders of the latex or polyvinyl acetate or polyvinyl alcohol type. When the starch binder is used in conjunction with another binder, e.g., a synthetic binder, the amount of the starch binder is preferably from about 2% to about 20% by weight, and the amount of the synthetic binder from about 2% to about 12% by weight, both based on the weight of dry pigment. In certain embodiments, at least about 50% by weight of the binder mixture comprises modified or unmodified starch.

Latex. Levels typically range from about 4% by weight to about 20% by weight. The latex may comprise for example a styrene butadiene rubber latex, acrylic polymer latex, polyvinyl acetate latex, or styrene acrylic copolymer, latex.

Other binders. Levels typically again range from about 4% by weight to about 20% by weight. Examples of other binders include proteinaceous adhesives such as, for example, casein or soy protein; polyvinyl alcohol.

Any of the above binders and binder types may be used alone or in admixture with each other and/or with other binders, if desired.

Optional Additional Components of the Composition

The coating composition according to the present invention may contain one or more optional additional components, if desired. Such additional components, where present, are suitably selected from known additives for paper coating compositions. Examples of known classes of optional additive are as follows:

One or more cross linkers. Such crosslinkers may be used in amounts of up to about 5% by weight; and include, for example, glyoxals, melamine formaldehyde resins, ammonium zirconium carbonates.

One or more water retention aids. Such water retention aids may be used in amounts up to about 2% by weight, and include, for example, sodium carboxymethyl cellulose, hydroxyethyl cellulose, PVOH (polyvinyl alcohol), starches, proteins, polyacrylates, gums, alginates, polyacrylamide bentonite and other commercially available products sold for such applications.

One or more viscosity modifiers and/or thickeners. Such viscosity modifiers and/or thickeners may be used in amounts up to about 2% by weight, and include, for example, acrylic associative thickeners, polyacrylates, emulsion copolymers, dicyanamide, triols, polyoxyethylene ether, urea, sulphated castor oil, polyvinyl pyrrolidone, CMC (carboxymethyl celluloses, for example sodium carboxymethyl cellulose), sodium alginate, xanthan gum, sodium silicate, acrylic add copolymers, HMC (hydroxymethyl celluloses), HEC (hydroxyethyl celluloses) and others.

One or more lubricity/calendering aids. Such lubricity/calendaring aids may be used in amounts up to about 2% by weight, and include, for example, calcium stearate, ammonium stearate, zinc stearate, wax emulsions, waxes, alkyl ketene dimer, glycols.

One or more dispersants. Such dispersants may be used in amounts up to about 2% by weight, and include, for example, polyelectrolytes such as polyacrylates and copolymers containing polyacrylate species, especially polyacrylate salts (eg sodium and aluminium optionally with a group II metal salt), sodium hexametaphosphates, non-ionic polyol, polyphosphoric acid, condensed sodium phosphate, non-ionic surfactants, alkanolamine and other reagents commonly used for this function.

One or more antifoamers/defoamers. Such antifoamers/defoamers may be used in amounts up to about 1% by weight, and include, for example, blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.

One or more dry or wet pick improvement additives. Such additives may be used in amounts up to about 2% by weight, and include, for example, e.g., melamine resin, polyethylene emulsions, urea formaldehyde, melamine formaldehyde, polyamide, calcium stearate, styrene maleic anhydride and others.

One or more dry or wet rub improvement and/or abrasion resistance additives. Such additives may be used in amounts up to about 2% by weight, and include, for example, glyoxal based resins, oxidised polyethylenes, melamine resins, urea formaldehyde, melamine formaldehyde, polyethylene wax, calcium stearate and others.

One or more gloss-ink hold-out additives. Such additives may be used in amounts up to about 2% by weight, and include, for example, oxidised polyethylenes, polyethylene emulsions, waxes, casein, guar gum, CMC, HMC, calcium stearate, ammonium stearate, sodium alginate and others.

One or more optical brightening agents (OBA) and/or fluorescent whitening agents (FWA). Such agents may be used in amounts up to about 1% by weight, and include, for example, stilbene derivatives.

One or more dyes, which may be used in amounts up to about 0.5% by weight.

One or more biocides/spoilage control agents. Such agents may be used in amounts up to about 1% by weight, and include, for example, metaborate, sodium dodecylbenene sulphonate, thiocyanate, organosulphur, sodium benzonate and other compounds sold commercially for this function, e.g., the range of biocide polymers sold by Nalco.

One or more levelling and evening aids. Such aids may be used in amounts up to about 2% by weight, and Include, for example, non-ionic polyol, polyethylene emulsions, fatty acid, esters and alcohol derivatives, alcohol/ethylene oxide, sodium CMC, HEC, alginates, calcium stearate and other compounds sold commercially for this function.

One or more grease and oil resistance additives. Such additives may be used in amounts up to about 2% by weight, and include, for example, oxidised polyethylenes, latex, SMA (styrene maleic anhydride), polyamide, waxes, alginate, protein, CMC, HMC.

One or more water resistance additives. Such additives may be used in amounts up to about 2% by weight, and include, for example, oxidised polyethylenes, ketone resin, anionic latex, polyurethane, SMA, glyoxal, melamine resin, urea formaldehyde, melamine formaldehyde, polyamide, glyoxals, stearates and other materials commercially available for this function.

One or more additional pigments. The pigment used in the present invention, namely the calcium carbonate and kaolin day system, may be used as the sole pigment in the paper coating compositions, or it may be used in conjunction with one or more other known pigments, such as for example, calcined kaolin, titanium dioxide, calcium sulphate, satin white, talc, and so called 'plastic pigment.' When a mixture of pigments is used, the calcium carbonate and kaolin clay system is generally present in the composition in an amount of at least about 80% of the total dry weight of the mixed pigments.

Any of the above additives and additive types may be used alone or in admixture with each other and/or with other additives, if desired.

For all of the above additives, the percentages by weight quoted are based on the dry weight of pigment (100%) present in the composition. Where the additive is present in a minimum amount the minimum amount may be about 0.01% by weight based on the dry weight of pigment.

The Coating Composition

The coating composition according to the present invention comprises an aqueous suspension of the particulate pigment together with the binder and optionally one or more further additive components, as discussed above.

The coating compositions according to the present invention advantageously comprise and preferably consist essentially of an aqueous suspension of the particulate pigment, the binder and optionally one or more further additive chosen from the list of additive types given above, with less than about 10% by weight of other ingredients.

The solids content of the paper coating composition according to the present invention may be greater than about 50% by weight, with certain embodiments being at least about 60%, and as high as possible but still giving a suitably fluid composition which may be used in coating.

Preparation of the Composition

According to another aspect of the present invention, there is provided a method for preparing the coating composition of the invention, which method comprises mixing the particulate pigment and the binder in an aqueous liquid medium to prepare a suspension of the solid components therein. The coating composition may suitably be prepared by conventional mixing techniques, as will be well known to one of ordinary skill in this art.

A pigment mixture may initially be formed by mixing aqueous suspensions of each of the required pigments to form an aqueous suspension incorporating the mixture of pigments. Such an aqueous suspension may be a dispersed aqueous suspension and the individual aqueous suspensions of pigments employed to form the mixture may each incorporate a dispersing agent. The dispersing agents employed to disperse the pigments in the individual aqueous suspensions are mixed together, and the concentrations of such suspensions may be the same or different.

The paper coating composition may be formed by mixing together an aqueous dispersed suspension containing the pigment components, with the binder and any other optional additional constituents, in a manner familiar to those skilled in the art Pigment Blends According to a third aspect of the present invention, there is provided a pigment composition for use in preparing the coating composition of the invention, the pigment composition comprising a mixture of: a first pigment component comprising particulate GCC having a psd steepness factor between about 30 and about 45; and a second pigment component comprising particulate PCC having a psd steepness factor ranging from about 55 to about 75, or particulate GCC having a psd steepness factor ranging from about 40 to about 55.

The pigment composition may be provided as a dry particulate mixture consisting of or including the components defined above or as a suspension of the particles in a liquid, suitably aqueous, medium.

Paper Coating Process

According to another aspect of the present invention, there is provided a method of use of the coating composition, which comprises applying the composition to coat a product, such as a sheet of paper and calendering the paper to form a coating, e.g., a gloss coating, thereon. The coating may be formed on both sides of the paper.

Calendering is a well known process in which paper smoothness and gloss is improved and bulk is reduced by passing a coated paper sheet between calender nips or rollers one or more times. Usually, elastomer coated rolls are employed to give pressing of high solids compositions. An elevated temperature may be applied. One or more (e.g. up to about 12, or sometimes higher) passes through the nips may be applied.

Methods of coating paper and other sheet materials, and apparatus for performing the methods, are widely published and well known. Such known methods and apparatus may conveniently be used for preparing coated paper according to the present invention. For example, there is a review of such methods published in Pulp and Paper International, May 1994, page 18 et seq. Sheets may be coated on the sheet forming machine, i.e., "on-machine," or "off-machine" on a coater or coating machine. Use of high solids compositions is desirable in the coating method because it leaves less water to evaporate subsequently. However, as is well known in the art, the solids level should not be so high that high viscosity and levelling problems are introduced.

The methods of coating according to the present invention are preferably performed using apparatus comprising (i) an application for applying the coating composition to the material to be coated; and (ii) a metering device for ensuring that a correct level of coating composition is applied. When an excess of coating composition is applied to the applicator, the metering device is downstream of it. Alternatively, the correct amount of coating composition may be applied to the applicator by the metering device, e.g., as a film press. At the points of coating application and metering, the paper web support ranges from a backing roll, e.g., via one or two applicators, to nothing (i.e., just tension). The time the coating is in contact with the paper before the excess is finally removed is the dwell time—and this may be short, long or variable.

The coating is usually added by a coating head at a coating station. According to the quality desired, paper grades are uncoated, single coated, double coated and even triple coated. When providing more than one coat, the initial coat (precoat) may have a cheaper formulation and optionally less be WC, LWC, ULWC, coated wood-free or board. In general, the advantages of the coating composition of the present invention are found at all conventional coating weights. However, in some cases it may be found that different combinations of advantages may be observed at different coating weights.

Test Methods

Sheet Gloss (75°)

The sheet gloss of a coated paper surface may be measured by means of a test laid down in TAPPI Standard No 480 ts-65. The intensity of light reflected at an angle from the surface of the paper is measured and compared with a standard of known gloss value. The beams of incident and reflected light are both at an angle of 75° to the normal of the paper surface. The results are expressed in TAPPI gloss units. The gloss of the coated paper according to the present invention may be greater than 50, and even greater than 60, TAPPI units.

Opacity

Opacity, as used herein, is a measure of percent reflectance of incident light off a coated substrate. The standard TAPPI test method T425 is used.

Brightness

The ISO brightness of the coated paper was measured by means of an Elrepho Datacolour 2000™ brightness meter fitted with a No. 8 filter (457 nm wavelength). The GE Brightness, as expressed herein, is defined in TAPPI Standard T452 and refers to the percentage reflectance to light of a 457 nm wavelength according to methods well known to those of ordinary skill in the art. The ISO brightness (+UV) of the coated paper was measured by means of an Elrepho Datacolour 3000™ brightness meter with D65 illumination according to the ISO 2469/2470 standards.

Print Gloss (75°)

The print gloss of a coated paper surface is measured through the following standard TAPPI test. The intensity of light reflected at an angle from the surface of the paper is measured and compared with a standard known print gloss value. The beams of incident and reflected light are both at an angle of 75 degrees to the normal of the paper surface. The results are expressed in TAPPI print gloss units.

Delta Print Gloss

Delta print gloss (or "snap") is defined as print gloss minus sheet gloss, and is a measure of the extent to which print stands out from the paper.

Porosity

The Gurley test method was used, according to the procedure well known in this art. The Gurley porosity test determines the degree to which paper is air-permeable by measuring the time required to pass 100 $cm^3$ of air through a sheet. The higher the Gurley test value, the less porous the sheet.

Paper Roughness

Paper roughness was measured using the Parker Print Surf (PPS) Instrument in accordance with the Tappi T555 standard.

EXAMPLES

Embodiments of the present invention will now be described, without limitation, with reference to the following illustrative Examples.

Example 1

In this example, the properties of calcium carbonate pigment blends and coating compositions according to the invention were measured in comparison to control blends and compositions.

The carbonates used were:
1. 100% GCC "A" (Pure Low Steepness Comparison);
2. 100% GCC "B" (Pure Medium Steepness Comparison);
3. 100% GCC "C" (Pure Medium Steepness Comparison);
4. 100% PCC "D" (Pure High Steepness Comparison);
5. 100% PCC "E" (Pure High Steepness Comparison);
6. 100% GCC "F" (Pure High Steepness Comparison);
7. 100% GCC "G" (Pure High Steepness Comparison);
8. 20:80 PCC "D":GCC "B";
9. 40:60 PCC "D":GCC "B";
10. 60:40 PCC "D":GCC "B";
11. 25:75 PCC "D":GCC "A";
12. 50:50 PCC "D":GCC "A";
13. 75:25 PCC "D":GCC "A";
14. 25:75 GCC "F":GCC "B";
15. 25:75 GCC "F":GCC "B"; and
16. 75:25 GCC "F":GCC "B".

The calcium carbonate blends 8 to 16 were first tested for GE brightness, psd, steepness and $d_{50}$. The results are shown in Table 1 below.

TABLE 1

| Blend | B'ness GE | wt % <2 µm | wt % <1 µm | wt % <½ µm | wt % <¼ µm | Steepness/d50 |
|---|---|---|---|---|---|---|
| 8 | 94.4 | 97 | 79 | 39 | 15 | 51/0.59 µm |
| 9 | 95.5 | 97 | 83 | 40 | 12 | 56/0.58 µm |
| 10 | 96.3 | 98 | 87 | 39 | 9 | 62/0.57 µm |
| 11 | 96.3 | 94 | 73 | 38 | 16 | 45/0.62 µm |
| 12 | 97 | 95 | 79 | 39 | 12 | 55/0.58 µm |
| 13 | 98 | 97 | 87 | 39 | 8 | 64/0.56 µm |
| 14 | 94.5 | 96 | 75 | 38 | 16 | 46/0.63 µm |
| 15 | 95.1 | 95 | 75 | 36 | 14 | 48/0.64 µm |
| 16 | 95.7 | 95 | 74 | 34 | 13 | 49/0.66 µm |

A range of aqueous coating compositions was prepared from carbonates 1 to 16 at about 64% solids (see Table 2), the solids portion being as follows:

100 parts total pigment (70 parts calcium carbonate:30 parts conventional kaolin coating pigment Fine No. 1, commercially available)

14 pph binder 1 pph thickener

The solids levels and Brookfield viscosities of the compositions were measured (Brookfield Viscosity at 10, 20, 50 and 100 rpm) and are shown in Table 2 below.

TABLE 2

| Pigment Number | Solids wt % | B'field Viscosity (cps) @ rpm | | | | Apparent Viscosity mPa |
|---|---|---|---|---|---|---|
| | | 10 | 20 | 50 | 100 | |
| 1 | 63.6 | 11480 | 6600 | 3300 | 1970 | 62.1 |
| 2 | 63.7 | 12280 | 6980 | 3390 | 2050 | 73.6 |
| 3 | 63.6 | 13480 | 7700 | 3840 | 2276 | 76.3 |
| 4 | 63.7 | 8960 | 5220 | 2632 | 1620 | 64.7 |
| 5 | 63.7 | 10200 | 5800 | 2808 | 1652 | 44.1 |
| 6 | 63.5 | 11840 | 6620 | 3248 | 1960 | 73.4 |
| 7 | 63.9 | 14170 | 8000 | 3824 | 2220 | 76.7 |
| 8 | 63.8 | 13880 | 7780 | 3776 | 2280 | 74.4 |
| 9 | 63.8 | 10190 | 6600 | 3304 | 2008 | 75.7 |
| 10 | 63.9 | 10400 | 6220 | 3064 | 1860 | 70.0 |
| 11 | 63.7 | 12080 | 6800 | 3400 | 2032 | 64.1 |
| 12 | 63.8 | 9640 | 5700 | 2800 | 1736 | 54.0 |
| 13 | 63.7 | 10180 | 5900 | 2920 | 1764 | 57.8 |
| 14 | 63.8 | 13000 | 7460 | 3704 | 2204 | 75.7 |
| 15 | 63.7 | 13640 | 7660 | 3700 | 2204 | 68.2 |
| 16 | 63.8 | 12000 | 6800 | 3260 | 1960 | 68.7 |

Coatings were then applied to approximately 50 g/$m^2$ base paper using the Heli-coater™ 2000 with a three-inch pond head set at a 50° blade angle. The machine speed was 800 m $min^{-1}$. All the colours were coated at constant solids with Brookfield viscosity adjusted by adjusting the thickener (on average, a dose of ca. 0.05 pph was required). Calendering conditions were as follows:

Instrument: Beloit Supercalender (chrome plated steel roll cotton roll)

Calendering Pressure: 250 psi (1.7 MPa)

Nips: 3 nips

Temperature: 60° C.

A range of coat weights between 9 and 15 gm$^{-2}$ were obtained and properties interpolated to a common coat weight within this range.

Example 2

In this example, the properties of calcium carbonate pigment blends and coating compositions according to the invention were measured in comparison to control blends and compositions.

The carbonates used were:
17. 100% GCC "H" (Pure Medium Steepness Comparison);
18. 100% PCC "J" (Pure High Steepness Comparison);
19. 30:70 PCC "J":GCC "I";
20. 50:50 PCC "J":GCC "I"; and
21. 70:30 PCC "J":GCC "I".

The calcium carbonate blends 19 to 21 were first tested for ISO brightness, psd, steepness and $d_{50}$. The results are shown in Table 3 below.

TABLE 3

| Blend | B'ness ISO | wt % <2 μm | wt % <1 μm | wt % <½ μm | wt % <¼ μm | Steepness/d50 |
|---|---|---|---|---|---|---|
| 19 | 93.9 | 98 | 84 | 54 | 23 | 44/0.46 μm |
| 20 | 94.7 | 99 | 88 | 59 | 21 | 48/0.43 μm |
| 21 | 95.5 | 99 | 91 | 64 | 18 | 54/0.42 μm |

A range of aqueous coating compositions was prepared from carbonates 17 to 21 at about 62% solids (see Table 4), the solids portion being as follows:

100 parts total pigment (70 parts calcium carbonate:30 parts conventional kaolin coating pigment Fine No. 1, commercially available)
11.5 pph latex binder
0.8 pph thickener
1.0 pph polyvinyl alcohol
1.0 pph optical brightening agent
1.0 pph lubricant The solids levels and Brookfield viscosities of the compositions were measured (Brookfield Viscosity at 100 rpm) and are shown in Table 4 below.

TABLE 4

| Pigment Number | Solids wt % | B'field Viscosity (cps) @ 100 rpm |
|---|---|---|
| 17 | 61.2 | 1330 |
| 18 | 61.8 | 1280 |
| 19 | 62.7 | 1720 |
| 20 | 62.7 | 1720 |
| 21 | 62.5 | 1560 |

Coatings were then applied to approximately 57 g/m² base paper using the Heli-coater™ 2000 with a three-inch pond head set at a 45° blade angle. The machine speed was 1000 m min$^{-1}$. All the colours were coated at maximum runnable solids. Calendering conditions were as follows:
Instrument: Perkins Supercalender
Calendering Pressure: 580 psi (4.0 MPa)
Nips: 6 nips
Temperature: 35° C.

A range of coat weights between 6 and 12 gm$^{-2}$ were obtained and properties interpolated to a common coat weight within this range.

Paper and Print results obtained for 9 gm$^{-2}$ of coating are shown in Table 5.

TABLE 5

| Coating | Sheet Gloss | PPS 10 μm | ISO Brightness | Opacity | ISO Brightness + UV | Print Gloss |
|---|---|---|---|---|---|---|
| 17 | 72 | 1.18 | 83.4 | 91.2 | 92.9 | 75 |
| 18 | 77 | 1.02 | 83.8 | 91.1 | 92.7 | 77 |
| 19 | 73 | 1.11 | 83.1 | 91.2 | 93 | 74 |
| 20 | 74 | 1.11 | 83.5 | 91.1 | 93.2 | 76 |
| 21 | 77 | 1.12 | 83.5 | 91.3 | 92.7 | 75 |

BRIEF DESCRIPTION OF THE DRAWINGS

The opacity, sheet brightness and delta print gloss properties of the paper coats were measured, and the results are shown in the accompanying drawings, in which:

FIG. 1 shows the opacity of the coated sheets 1-16, ranked in order.

FIG. 2 shows the brightness of the coated sheets 1-16, ranked in order.

FIG. 3 shows the delta gloss of the coated sheets 1-16, ranked in order.

DETAILED DESCRIPTION OF THE DRAWINGS

As shown in the drawings, the addition of relatively small amounts of steep GCC or PCC to either non-steep or moderately steep GCC results in carbonate blends having performance which is near-equivalent, equivalent or better than that achieved when fully steep components are used alone. Hence, use of these pigment blends in colour formulations offer the papermaker a number of options for improved quality and consistency.

The invention claimed is:

1. A composition comprising:
a first pigment component comprising particulate ground calcium carbonate (GCC) having a particle size distribution (psd) steepness factor ranging from less than 36 to about 30; and a second pigment component comprising particulate precipitated calcium carbonate (PCC) having a psd steepness factor ranging from about 55 to about 75 and a d50 not greater than 0.5 μm.

2. A composition according to claim 1, wherein the first and second component particles are present in an amount such that the weight ratio of the first component particles to the second component particles ranges from about 5:95 to about 95:5.

3. A composition according to claim 2, wherein the weight ratio of the first component particles to the second component particles ranges from about 10:90 to about 90:10.

4. A composition according to claim 3, wherein the weight ratio of the first component particles to the second component particles ranges from about 30:70 to about 70:30.

5. A composition according to claim 1, further comprising a kaolin clay.

6. A composition according to claim 5, wherein said kaolin clay is present in an amount such that the weight ratio of the first and second calcium carbonate pigments to the kaolin clay is at least about 10:90.

7. A composition according to claim 6, wherein the weight ratio is at least about 70:30.

8. A composition according to claim 1, wherein said composition is a pigment in the form of a dry particulate mixture.

9. A composition according to claim 1, wherein said composition is a pigment in the form of a suspension of said particles in a liquid medium.

10. A composition according to claim 1, wherein said composition is a pigment for paper and other substrates.

11. A composition according to claim 1, wherein the second pigment component comprises PCC having a $d_{50}$ of less than 0.5 µm.

12. A composition according to claim 1, wherein the second pigment component comprises PCC having a $d_{50}$ of less than 0.45 µm.

13. A composition according to claim 1, wherein the second pigment component comprises PCC having a $d_{50}$ of less than 0.40 µm.

14. A composition according to claim 1, wherein the second pigment component comprises PCC having a $d_{50}$ of less than 0.35 µm.

15. A composition according to claim 1, wherein the second pigment component comprises PCC having a $d_{50}$ ranging from 0.2 µm to 0.5 µm.

16. A composition according to claim 1, wherein the second pigment component comprises PCC having a $d_{50}$ ranging from 0.3 µm to 0.5 µm.

17. A composition according to claim 1, wherein the second pigment component comprises PCC having a $d_{50}$ of about 0.4 µm.

18. A composition according to claim 1, wherein the composition consists essentially of the first pigment component and the second pigment component; the first pigment component consists essentially of the GCC and the second pigment component consists essentially of the PCC.

19. A coating composition comprising an aqueous suspension of at least one particulate pigment and at least one binder, wherein the particulate pigment comprises a mixture of: a first pigment component comprising particulate ground calcium carbonate (GCC) having a particle size distribution (psd) steepness factor ranging from less than 36 to about 30; and a second pigment component comprising particulate precipitated calcium carbonate (PCC) having a psd steepness factor ranging from about 55 to about 75 and a d50 not greater than 0.5 µm.

20. A coating composition according to claim 19, wherein the pigment is for paper and other substrates.

21. A coating composition according to claim 19, wherein the at least one binder is present in an amount ranging from about 4% to about 30% of the solids of the composition on a dry weight basis.

22. A coating composition according to claim 19, wherein the at least one binder comprises a modified starch.

23. A coating composition according to claim 19, wherein the at least one binder comprises an unmodified starch.

24. A coating composition according to claim 22, wherein the at least one binder comprises a component other than starch.

25. A coating composition according to claim 19, further comprising: one or more cross linkers; one or more water retention aids; one or more viscosity modifiers and/or thickeners; one or more lubricity/calendering aids; one or more dispersants; one or more antifoamers/defoamers; one or more dry or wet pick improvement additives; one or more dry or wet rub improvement and/or abrasion resistance additives; one or more gloss-Ink hold-out additives; one or more optical brightening agents (OBA) and/or fluorescent whitening agents (FWA); one or more dyes; one or more biocides/spoilage control agents; one or more leveling and evening aids; one or more grease and oil resistance additives; one or more water resistance additives; one or more additional pigments; or any combination thereof.

26. A coating composition according to claim 19, further comprising an optional component in an amount of less than about 10% by weight, relative to the total weight of the composition.

27. A coating composition according to claim 19, wherein the second pigment component comprises PCC having a $d_{50}$ of less than 0.5 µm.

28. A coating composition according to claim 19, wherein the second pigment component comprises PCC having a $d_{50}$ of less than 0.45 µm.

29. A coating composition according to claim 19, wherein the second pigment component comprises PCC having a $d_{50}$ of less than 0.40 µm.

30. A coating composition according to claim 19, wherein the second pigment component comprises PCC having a $d_{50}$ of less than 0.35 µm.

31. A coating composition according to claim 19, wherein the second pigment component comprises PCC having a $d_{50}$ ranging from 0.2 µm to 0.5 µm.

32. A coating composition according to claim 19, wherein the second pigment component comprises PCC having a $d_{50}$ ranging from 0.3 µm to 0.5 µm.

33. A coating composition according to claim 19, wherein the second pigment component comprises PCC having a $d_{50}$ of about 0.4 µm.

34. A coating composition according to claim 19, wherein the coating composition consists essentially of the aqueous suspension of the at least one particulate pigment and the at least one binder, and wherein the at least one particulate pigment consists essentially of the mixture of the first pigment component and the second pigment component and wherein the first pigment component consists essentially of the particulate GCC, and the second pigment component consists essentially of the particulate PCC.

35. A method for preparing a coating composition comprising mixing at least one particulate pigment comprising a mixture of:
a first pigment component comprising particulate ground calcium carbonate (GCC) having a particle size distribution (psd) steepness factor ranging from less than 36 to about 30; and a second pigment component comprising particulate precipitated calcium carbonate (PCC) having a psd steepness factor ranging from about 55 to about 75 and a d50 not greater than 0.5 µm, and at least one binder into an aqueous liquid medium and then preparing a suspension of the solid components therein.

36. A method for preparing a coated product,
comprising applying to said product a composition comprising an aqueous suspension of at least one particulate pigment and at least one binder, wherein the particulate pigment comprises a mixture of: a first pigment component comprising particulate ground calcium carbonate (GCC) having a particle size distribution (psd) steepness factor ranging from less than 36 to about 30; and a second pigment component comprising particulate precipitated calcium carbonate (PCC) having a psd steepness factor ranging from about 55 to about 75 and a d50 not greater than 0.5 µm; further comprising calendering said product to form a coating thereon.

37. A method according to claim 36, wherein said product is in the form of paper, board, card, or paper board.

38. A product coated with a coating comprising a dry residue of a composition comprising an aqueous suspension of at least one particulate pigment and at least one binder, wherein the particulate pigment comprises a mixture of: a first pigment component comprising particulate ground calcium carbonate (GCC) having a particle size distribution (psd) steepness factor ranging from less than 36 to about 30; and a second pigment component comprising particulate precipitated calcium carbonate (PCC) having a psd steepness factor ranging from about 55 to about 75 and a d50 not greater than 0.5 μm.

39. A product according to claim 38, wherein said product is in the form of paper, board, card, or paper board.

40. A composition according to claim 5, wherein said kaolin clay has a $d_{50}$ of greater than or equal to about 0.5 μm.

41. A composition according to claim 5, wherein said kaolin clay has a $d_{50}$ less than about 0.5 μm.

42. A composition according to claim 40, wherein said kaolin clay has a $d_{50}$ ranging from about 0.5 μm to about 1.5 μm.

43. A composition according to claim 41, wherein said kaolin clay has a $d_{50}$ ranging from about 0.1 μm to about 0.5 μm.

44. A composition according to claim 5, wherein said kaolin clay has a shape factor greater than about 25.

45. A composition according to claim 5, wherein said kaolin clay has a shape factor greater than about 30.

46. A composition according to claim 5, wherein said kaolin clay has a shape factor greater than about 45.

47. A composition according to claim 5, wherein said kaolin clay has a shape factor less than about 25.

48. A composition according to claim 5, wherein said kaolin clay has a shape factor ranging from about 5 to about 20.

49. A composition according to claim 5, wherein said kaolin clay has a shape factor less than about 25 and a $d_{50}$ less than about 0.5 μm.

50. A composition according to claim 5, wherein said kaolin clay has a steepness greater than about 20.

51. A composition according to claim 5, wherein said kaolin clay has a steepness ranging from about 25 to about 45.

52. A coating composition according to claim 23, wherein the at least one binder comprises a component other than starch.

53. A coating composition according to claim 25, further comprising an optional component in an amount of less than about 10% by weight, relative to the total weight of the composition.

* * * * *

UNITED STATES PATENT AND TRADEMARK OFFICE
CERTIFICATE OF CORRECTION

PATENT NO. : 7,744,688 B2
APPLICATION NO. : 10/538012
DATED : June 29, 2010
INVENTOR(S) : David Skuse et al.

It is certified that error appears in the above-identified patent and that said Letters Patent is hereby corrected as shown below:

Claim 1, col. 16, line 46, "d50" should read -- $d_{50}$ --.

Claim 35, col. 18, line 46, "d50" should read -- $d_{50}$ --.

Claim 36, col. 18, line 59, "d50" should read -- $d_{50}$ --.

Claim 38, col. 19, line 6, "d50" should read -- $d_{50}$ --.

Signed and Sealed this

Thirty-first Day of August, 2010

David J. Kappos
*Director of the United States Patent and Trademark Office*